US008329078B2

United States Patent
Gueret et al.

(10) Patent No.: US 8,329,078 B2
(45) Date of Patent: Dec. 11, 2012

(54) MANUFACTURE OF AN AGGLOMERATE CONSISTING OF PHASE CHANGE MATERIAL AND HAVING CONTROLLED PROPERTIES

(75) Inventors: Vincent Gueret, Paris (FR); Christian Monereau, Paris (FR); Pluton Pullumbi, Versailles (FR)

(73) Assignee: L'Air Liquide Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 74 days.

(21) Appl. No.: 13/057,914

(22) PCT Filed: Sep. 25, 2009

(86) PCT No.: PCT/FR2009/051827
§ 371 (c)(1),
(2), (4) Date: Feb. 7, 2011

(87) PCT Pub. No.: WO2010/034954
PCT Pub. Date: Apr. 1, 2010

(65) Prior Publication Data
US 2011/0169179 A1   Jul. 14, 2011

(30) Foreign Application Priority Data

Sep. 25, 2008 (FR) ..................... 08 56443

(51) Int. Cl.
*B29C 67/02* (2006.01)
(52) U.S. Cl. .................. 264/117; 23/313 R; 23/313 FB
(58) Field of Classification Search .................. None
See application file for complete search history.

(56) References Cited

U.S. PATENT DOCUMENTS

| 4,971,605 A | 11/1990 | Tarman |
| 2003/0026973 A1* | 2/2003 | Pause .................. 428/310.5 |
| 2010/0043635 A1 | 2/2010 | Gueret et al. |

FOREIGN PATENT DOCUMENTS

| DE | 19711393 | 8/1998 |
| EP | 1188470 | 3/2002 |
| EP | 1536128 | 6/2005 |
| FR | 2891159 | 3/2007 |
| FR | 2906160 | 3/2008 |

OTHER PUBLICATIONS

Search Report for PCT/FR2009/051827, Mar. 9, 2010.

* cited by examiner

*Primary Examiner* — Mary F Theisen
(74) *Attorney, Agent, or Firm* — Elwood L. Haynes

(57) ABSTRACT

The present invention relates to a process for manufacturing an agglomerate in the form of beads made up of microcapsules of a phase change material, the process comprising wet-granulation and fluidized-bed drying.

26 Claims, No Drawings

MANUFACTURE OF AN AGGLOMERATE CONSISTING OF PHASE CHANGE MATERIAL AND HAVING CONTROLLED PROPERTIES

This application is a §371 of International PCT Application PCT/FR2009/051827, filed Sep. 25, 2009.

FIELD OF THE INVENTION

The invention relates to a process for manufacturing an agglomerate in the form of beads made up of microcapsules of a phase change material (PCM), produced by wet granulation and fluidized-bed drying.

BACKGROUND

It is known that phase change materials (PCMs) act as heat sinks at their phase-change temperature.

PCMs may be organic, such as paraffins and silicones, or inorganic, such as hydrated salts and metal alloys.

The expression "thermo-cyclic process" refers to any cyclic process during which certain steps are exothermic, i.e. accompanied by heat evolution, while certain other steps are endothermic, i.e. accompanied by heat consumption.

Typical examples of thermo-cyclic processes for which the invention may be carried out include:

gas separation processes such as PSA (Pressure Swing Adsorption), VSA (Vacuum Swing Adsorption), VPSA (Vacuum Pressure Swing Adsorption) and MPSA (Mixed Pressure Swing Adsorption); and any process employing a chemical conversion coupled to pressure swing adsorption cycles, such as those mentioned above, for shifting the equilibrium of chemical reactions.

Pressure swing adsorption separation processes are based on the phenomenon of physical adsorption and are used to separate or purify gases by pressure-cycling the gas to be treated through one or more adsorbent beds, such as zeolite, active carbon, activated alumina, silica gel or molecular sieve beds, or the like.

In the context of the present invention, unless otherwise stipulated the term "PSA process" denotes any gas separation process by pressure swing adsorption, employing a cyclic variation of the pressure between a high pressure, called the adsorption pressure, and a low pressure, called the regeneration pressure. Consequently, the generic term "PSA process" will be used also to denote the following cyclic processes:

VSA processes in which the adsorption is carried out substantially at atmospheric pressure, called the "high pressure", i.e. between 1 bara and 1.6 bara (bara=bar absolute), preferably between 1.1 and 1.5 bara, and the desorption pressure, called the "low pressure", is below atmospheric pressure, typically between 30 and 800 mbara, preferably between 100 and 600 mbara;

VPSA or MPSA processes in which the adsorption is carried out at a high pressure substantially above atmospheric pressure, generally between 1.6 and 8 bara, preferably between 2 and 6 bara, and the low pressure is below atmospheric pressure, typically between 30 and 800 mbara, preferably between 100 and 600 mbara;

PSA processes in which the adsorption is carried out at a high pressure substantially above atmospheric pressure, typically between 1.6 and 50 bara, preferably between 2 and 35 bara, and the low pressure is above or substantially equal to atmospheric pressure, and therefore between 1 and 9 bara, preferably between 1.2 and 2.5 bara; and RPSA (rapid PSA) processes, which denote PSA processes with a very rapid cycle, generally shorter than one minute.

In general, a PSA process makes it possible to separate one or more gas molecules from a gas mixture containing them, by exploiting the difference in affinity of a given adsorbent or, where appropriate, several adsorbents, for these various gas molecules.

The affinity of an adsorbent for a gas molecule depends on the structure and composition of the adsorbent, and also on the properties of the molecule, especially its size, its electronic structure and its multipolar moments.

An adsorbent may for example be a zeolite, an active carbon, an activated alumina, a silica gel, a carbon or non-carbon molecular sieve, an organometallic structure, one or more oxides or hydroxides of alkali or alkaline-earth metals, or a porous structure containing a substance capable of reversibly reacting with one or more gas molecules, such as amines, physical solvents, metal complexing agents, and metal oxides or hydroxides for example.

The thermal effects that result from the enthalpy of adsorption or the enthalpy of reaction generally result in the propagation, at each cycle, of a heatwave at adsorption that limits the adsorption and of a cold wave at desorption that limits the desorption.

This local cyclic phenomenon of temperature swings has a not insignificant impact on the separation performance and the specific separation energy, as document EP-A-1 188 470 implicates.

One particular case covered in the context of the present patent is the storage of gas in and removal of gas from a reactor or adsorber at least partly containing one or more adsorbents. Here too, a thermo-cyclic process involves an adsorbent material with heat release during gas storage (increase in pressure) and heat absorption during gas removal (decrease in pressure).

In both these cases, one solution for reducing the amplitude of the thermal swings consists in adding a phase change material (PCM) to the adsorbent bed, as described by document U.S. Pat. No. 4,971,605. In this way, the adsorption and desorption heat, or some of this heat, is adsorbed in latent heat form by the PCM at the temperature, or in the temperature range, of the phase change of the PCM. It is then possible to operate the PSA unit in a mode closer to isothermal.

The PCMs may be microencapsulated and thus available in powder form. More precisely, microencapsulated PCMs take the form of microbeads of a polymer forming an impermeable shell containing wax or a linear saturated hydrocarbon with between 14 and 24 carbon atoms. Said microencapsulation is generally obtained by phase inversion of an emulsion using processes known to those skilled in the art. The mean size of a microbead is around 5 microns. The general shape of the capsule is spherical, but it could instead be ellipsoidal or even potato-shaped. The diameter of said capsule may then be defined as that of the sphere containing it.

When the temperature increases, the hydrocarbon contained in the bead absorbs the heat and stores it. When the temperature decreases, the hydrocarbon contained in the microbead releases the stored latent heat by changing from a liquid phase to a solid phase. During the phase change period, the temperature remains approximately constant (depending on the composition of the wax) and allows the temperature to be regulated to levels well defined by the nature of the hydrocarbon (or hydrocarbons when there is a mixture thereof) and in particular by the length of the chain and the number of carbon atoms. One commercial example of a PCM corresponding to this description is the product Micronal® from BASF.

However, microencapsulated PCMs cannot be introduced as such into an adsorbent bed as it would be difficult to control the distribution thereof. Furthermore, they would be entrained by the gas streams flowing through the adsorber. It is therefore necessary beforehand to produce "agglomerates". The term "agglomerate" is understood hereafter to mean a solid with a size of greater than 0.1 mm that may adopt various forms, in particular a bead, extrudate, pellet or milled form, obtained by milling and screening blocks of larger sizes, or a plate form obtained by cutting precompacted sheets, or the like. In the context of the invention, the particles involved are more particularly of spherical appearance, which will be denoted by the term "beads".

A first solution involves making an intimate mixture of the adsorbent—in powder or crystal form—and of the PCMs and agglomerating the mixture. The products obtained by dry compression prove generally to be too fragile for industrial use. Agglomeration in a liquid or wet phase poses the problem of how to activate the active phase of the agglomerate. Indeed, it is known that most adsorbents have to be heated to a high temperature before use in industrial processes for achieving the required performance. The required temperature level is generally above 200° C., and often around 300 to 450° C. These temperature levels are not compatible with the mechanical integrity of the PCMs.

A second solution consists in making only PCM agglomerates, in the form of a structure that can be easily handled and introduced into an adsorber.

However, the processes for manufacturing agglomerates according to the current state of the art (pelletizing under pressure, extrusion, etc.) do not result in agglomerates with mechanical and/or thermal properties sufficient to be used effectively in thermo-cyclic processes.

One of the reasons for this is that the operating conditions for manufacturing these agglomerates—by the processes conventionally used to manufacture rods, beads or pellets of adsorbents or catalysts—are limited by the intrinsic strength of the PCMs themselves. By dint of their nature, they would be unable to withstand the pressures or temperatures needed to form strong agglomerates.

Another reason stems from the particular nature of the shell (for example polymeric) and from the deformability of the capsules, which makes processes such as pressure agglomeration not very effective.

More precisely, the agglomerates formed by conventional means while respecting the pressure and temperature constraints inherent in PCMs are too friable for industrial applications, in particular those of the PSA type. A fraction of the agglomerates break up, thereby causing problems of poor distribution of the process fluid in the adsorber or problems of the filter being blocked by creating fine dust consisting of PCMs.

A third approach consists in integrating the PCM microparticles in a preexisting solid structure such as a cellular structure, namely a "honeycomb" structure or a foam, a lattice, a mesh, etc., for example by bonding to the walls. Such materials that can be produced in the laboratory cannot be used in large industrial units (with a volume greater than 1 m$^3$ and more generally greater than 10 m$^3$) for manufacturing or cost reasons.

The aim of the present invention is therefore to alleviate these drawbacks by producing agglomerates made up of PCMs of shape, diameter and density such that a mixture of adsorbent particles and these agglomerates remains homogeneous in space and over time during operation of PSA-type units. In particular, the mechanical strength of such agglomerates (crush and attrition resistance) enables them to remain intact under the operating conditions. This invention allows such agglomerates to be produced in large quantities and at low cost.

SUMMARY OF THE INVENTION

The solution provided by the invention is therefore a process for manufacturing an agglomerate in the form of beads made up of microcapsules of a phase change material (PCM), characterized in that said process is carried out by a wet-granulation and fluidized-bed drying process.

DETAILED DESCRIPTION OF THE INVENTION

Depending on the case, the process for manufacturing the agglomerate according to the invention may comprise one or more of the following features:

the wet granulation comprises a step of spraying a suspension comprising at least one aqueous solution, preferably water, and PCM microcapsules into a reactor, a gas stream flowing upwardly through said reactor;

the spray pressure is between 1 and 10 bar abs, preferably less than 3 bar abs, the pressure in the reactor is between 0.9 and 1.1 bar abs, preferably between 0.98 and 1.03 bar abs, and the temperature of the gas stream is between 40 and 200° C., preferably between 60 and 90° C.; "spray pressure" is understood to mean the pressure upstream of the injection nozzle and used to introduce the suspension;

the suspension comprises between 10 and 50% by weight, preferably 20 to 30% by weight, of PCM microcapsules;

the suspension comprises carbon fibers;

the suspension has a carbon fiber/PCM ratio of between 1 and 40 wt %;

0.001 to 1% by weight, preferably 0.01 to 0.1% by weight, of surfactant is added to the aqueous solution;

the surfactant is a siloxane-based surfactant;

the suspension comprises a binder representing less than 30% by weight, preferably less than 10% by weight, of the aqueous suspension;

the binder is polyvinyl alcohol or carboxymethylcellulose;

the wet granulation comprises a step during which at least a fraction of at least one constituent of the granulate in solid form (PCM, binder, additive such as carbon fibers) is introduced separately;

the phase change material is chosen from paraffins, fatty acids, nitrogen-containing compounds, oxygen-containing compounds, phenyls and hydrated salts, or a mixture of these compounds;

the fluidized-bed drying is carried out by a gas, preferably by air, at a temperature of between 40 and 200° C., preferably between 60 and 90° C.;

the fluidized-bed drying is carried out under a pressure of between 0.9 and 1.1 bar abs, preferably between 0.98 and 1.03 bar abs; and said process employs a means for extracting the agglomerates of a given size or mass.

More precisely, in a wet granulation and fluidized-bed drying process applied to the manufacture of agglomerates intended to be used in thermo-cyclic processes, a suspension (essentially homogeneous mixture of solid particles in a liquid medium) containing, as a minimum, an aqueous solution and the PCM microparticles is injected, preferably by spraying, into a reactor through which a hot gas stream flows. This gas stream is essentially directed upwardly through said reactor so as to keep the particles formed in suspension. For this application, said gas will preferably be atmospheric air, possibly partly dried by a suitable means. The pressure in the reactor is close to atmospheric pressure. It may be slightly below atmospheric pressure when the gas is extracted mechanically from the reactor (using a fan-type extractor for example, maintaining a reduced pressure of at most a few tens of millibars). Over the course of time, the injected suspension uniformly coats the moving particles, giving them an essentially spherical shape. This process is also called "spray coating" and the term "fluidized bed" is used to describe the operation of the reactor.

The operating parameters (injection rate, air flow rate, pressure, temperature) have to be adapted according to the type of granulator used according to the rules of the art, but it should be noted that in general these operating conditions are particularly suited to the nature of the PCMs with maximum pressures of only a few bars upstream of the injection nozzles (generally between 1 and 10 bar abs) and moderate temperatures (which may remain below 100° C.). The pressures remain well below the pressures for pelletizing, extruding (at several tens of bars) or activating the adsorbent/PCM mixtures.

The microencapsulated PCMs take the form of microbeads of a polymer forming an impermeable shell containing wax or a linear saturated hydrocarbon having between 14 and 24 carbon atoms. The capsules of essentially spherical appearance have a mean diameter of about 1 to 20 microns. The mean size of the microbeads used during the agglomeration tests was around 5 microns, corresponding to the BASF product Micronal®.

The solvent, that is to say the aqueous solution, the main role of which is to promote the dispersion of the PCM microparticles, is preferably water. Apart from its low cost, water is simple to use and requires no special precaution.

The suspension may generally comprise, in addition to the aqueous solution and the PCM microcapsules:
- a surfactant (or emulsifier), the role of which is to ensure good dispersion and good stability of the solution;
- a binder, the role of which is to improve the adhesion of the constituent elements of the bead and therefore the mechanical properties of said beads; and
- an additive specific to the characteristic or characteristics of the beads that it is desired to modify.

In the following examples, the amount of these various products is expressed as a percent by weight (relative to all of the ingredients constituting the suspension), unless otherwise indicated.

Thus, for the overall composition of one of the suspensions mentioned below by way of example, namely 300 g of PCM/449 g of solvent (water)/50 g of additive: carbon fiber/200 g of PVA binder/1 g of Degussa (Evonik) Tego® surfactant, the following characteristic percentages are obtained: MCP: 30%; binder: 20%; surfactant: 0.1%; and CF/PCM ratio: 16.7%.

The surfactant is a "surface-active" molecule which may be natural or synthetic, with the particular feature of having a polar (hydrophilic) head possessing an affinity for water, and more generally for any polar (solvent) compound, and an apolar (lipophilic) tail usually formed from one or more hydrocarbon chains and having an affinity for substantially nonpolar surfaces as is the case of the PCMs. In particular, siloxane-based surfactants such as for example Tego® from Degussa (Evonik) make it possible to obtain a very good dispersion.

One additive used by the Applicant consists of carbon fiber (CF), the main role of which is to improve the thermal conduction of the beads. Other additives could be used, depending on the intended objective (strength, porosity, etc.).

It should be noted that a number of variants may be introduced into the process as described here, without departing from the scope of the invention. In particular, the constituents of the bead may be introduced separately into the reactor instead of being introduced in the form of a single spray. For example, one or more solid materials, that is to say the PCM powder and/or the binder and/or the additive, may be introduced via a nozzle, conveyed by a gas stream. The aqueous solution and the surfactant may then be introduced separately in the form of a liquid spray. One part of the reactor may then be dedicated to intimately mixing these ingredients.

The "initiation" of granulation, that is to say the formation of the small base particle which then serves as nucleus for forming the particle of the desired size (generally 0.1 to 5 mm), may be carried out in several ways. It may be carried out naturally, by introducing the suspension into the reactor, possibly using a first method of operation (flow rates, pressure) different from the final method of operation. The granulation may also be carried out starting from nuclei that have already been formed, prior to their introduction into the reactor. These nuclei may be materials differing in nature from the agglomerate created, such as for example grains of sand, but also fine particles, of a few tens of microns in size, obtained by grinding PCM agglomerates produced beforehand (for example from particles having dimensions outside the adopted range, that is to say particles that are too small or too coarse).

This type of wet granulation and fluidized-bed drying reactor has been developed essentially for the manufacture of medicinal products. There are several types, depending on the introduction of the ingredients as described above or depending on the method of extraction of the particles formed. The various devices used in fluidized-bed processes for extracting particles of a given size or mass apply here, and their description does not fall within the scope of this invention.

The carbon fiber, which may be contained in the agglomerate according to the invention, acts as a promoter of high thermal conductivity. In this case, said promoter of high thermal conductivity represents no more than 10% by volume of the whole, the rest consisting of the PCM which provides the thermal efficiency of the device. Ideally, the promoter of high thermal conductivity has a thermal conductivity of greater than 100 W/m/K, preferably greater than 500 W/m/K.

The binder may be chosen from
a) the group of thermoplastic resins formed by the following resins: (i) acrylonitrile-butadiene-styrene (ABS); (ii) acrylonitrile-ethylene/propylene-styrene (AES); (iii) methyl methacrylate-butadiene-styrene (MBS); (iv) acrylonitrile-butadiene-methyl methacrylate-styrene (ABMS); and (v) acrylonitrile-n-butyl acrylate-styrene (AAS);
b) modified polystyrene gums;
c) polystyrene, polymethyl methacrylate, cellulose acetate, polyamide, polyester, polyacrylonitrile, polycarbonate, polyphenylene oxide, polyketone, polysulfone and polyphenylene sulfide resins;
d) halogenated (fluorinated or chlorinated) resins, silicone resins and polybenzimidazole resins;
e) the group of thermosetting resins formed by resins based on: phenol, urea, melamine, xylene, diallyl phthalate, epoxy, aniline, furan, or polyurethane;
f) the group of thermoplastic elastomers consisting of elastomers of the styrene type, such as styrene-butadiene-styrene block copolymers or styrene-isoprene-styrene block copolymers, or these copolymers in hydrogenated form, elastomers of the PVC, urethane, polyester or polyamide type, thermoplastic elastomers of the polybutadiene type, such as 1,2-polybutadiene or trans-1,4-polybutadiene resins; chlorinated polyethylenes, fluorinated thermoplastic elastomers, polyetheresters and polyetheramides;

g) the group of water-soluble polymers consisting of the following: cellulose polymers, polyelectrolytes, ionic polymers, acrylate polymers, acrylic acid polymers, gum Arabic, polyvinylpyrrolidone, polyvinyl alcohol, polyacrylic acid, polymethacrylic acid, sodium polyacrylate, polyacrylamide, polyethylene oxide, polyethylene glycol, polyethyleneformamide, polyhydroxyether, polyvinyloxazolidinone, methylcellulose, ethylcellulose, carboxymethylcellulose, ethyl (hydroxyethyl)cellulose, sodium polyacrylate, copolymers thereof and blends thereof; and h) the group formed by the following: polystyrenesulfonate (PSS), poly(1-vinylpyrrolidone-co-vinyl acetate), poly(1-vinylpyrrolidone-co-acrylic acid), poly(1-vinylpyrrolidone-co-dimethylaminoethyl methacrylate), polyvinyl sulfate, poly(sodium styrene-sulfonic acid-co-maleic acid), dextran, dextran sulfate, gelatin, bovine albumen serum, poly (methyl methacrylate-co-ethyl acrylate), polyallylamine, and combinations thereof; and preferably the group consisting of carboxyvinyl polymers (CVPs), hydroxypropylcellulose (HPC) and carboxymethylcellulose (CMC). Preferably, the binder is chosen from groups g) and h).

The fluidized-bed drying is carried out by a gas, preferably by air, at a pressure close to atmospheric pressure, preferably with an overpressure or an underpressure of the order of a few tens of millibars at most.

The invention also relates to an agglomerate in the form of beads made up of microcapsules of a phase change material (PCM), characterized in that said agglomerate is obtained by a process according to the invention and has a characteristic size of between 0.1 and 5 mm and a packed bed density of 300 to 1200 kg/m$^3$.

The term "characteristic size" of the agglomerate is understood to mean the diameter of the latter, which may be defined as follows. For a population of beads which are essentially spherical, but the diameters of which have a scatter inherent in the industrial manufacturing process, one conventional definition that may be used is the following: the equivalent diameter of a population of beads is the diameter of identical beads which, for the same bed volume, would give the same total surface area. Specifically, after the diameter distribution has been determined (that is to say after the various fractions $X_i$ of diameter $D_i$, where preferably i is greater than or equal to 5, have been determined in order to obtain sufficient precision, for example by screening or using image processing equipment), the equivalent diameter is obtained from the formula:

$$1/D_e = \sum_i (X_i/D_i).$$

The term "packed bed density" is understood to mean the maximum density that can be obtained when filling a given volume. One conventional laboratory method, which is also adopted here, is that called the crossed-screen method: the particles feed, from above, a series of screens (generally two screens) having mesh sizes greater than the particle diameters so that the flow of the particles into the test container is like rain.

Preferably, said agglomerate has a thermal conductivity greater than 0.2 W/m/K, preferably greater than 0.6 W/m/K, and a crush resistance greater than 2 N/mm$^2$, preferably greater than 5 N/mm$^2$.

The crush resistance is measured individually on a sufficient number of agglomerates with a given mean diameter d (a minimum of 25 agglomerates taken randomly after screening) by a suitable apparatus. The value indicated here is the average value divided by the equatorial cross section ($\pi d^2/4$) of the bead.

Moreover, the invention also relates to a reactor or adsorber, characterized in that said reactor or adsorber comprises a bed of adsorbent particles comprising, furthermore, agglomerates of beads containing microcapsules of a phase change material (PCM) according to the invention.

Preferably, said agglomerates are mixed with the adsorbent particles so as to form a composite bed.

The mixture may be formed, before or during the filling, by means of suitable devices.

The invention also relates to a PSA process for separating and/or purifying a multicomponent gas mixture by adsorption, employing one or more adsorbers, characterized in that each adsorber contains a bed of adsorbent particles comprising, furthermore, agglomerates of beads containing microcapsules of a phase change material (PCM) according to the invention.

Said process may be chosen from $H_2$ PSA, $O_2$ PSA, $N_2$ PSA and $CO_2$ PSA processes and/or thermo-cyclic processes, by means of which a gas rich in at least one of the following constituents is produced: $H_2$, $O_2$, $N_2$, CO, $CH_4$, $CO_2$ and mixtures thereof, preferably a gas containing at least 50% by volume of $H_2$, $O_2$, $N_2$, CO, $CH_4$, $CO_2$ or mixtures thereof.

The invention also relates to a gas storage/retrieval process employing one or more adsorbers, characterized in that each adsorber contains a bed of adsorbent particles comprising, furthermore, agglomerates of beads containing microcapsules of a phase change material (PCM) according to the invention, said gas possibly being predominantly natural gas, air, nitrogen, hydrogen, argon, methane or $CO_2$.

In accordance with the invention and by way of nonlimiting examples, agglomerates having advantageous characteristics have been produced with the following various suspension compositions:

1. 300 g of PCM/679 g of solvent (water)/20 g of PVA (polyvinyl alcohol) binder/1 g of Degussa (Evonik) Tego® surfactant;
2. 300 g of PCM/689 g of solvent (water)/10 g CMC (carboxymethylcellulose) binder/1 g Degussa (Evonik) Tego® surfactant;
3. 250 g of PCM/549 g of solvent (water)/100 g of CF/10 g of PVA binder/1 g of Degussa (Evonik) Tego® surfactant;
4. 300 g of PCM/449 g of solvent (water)/50 g of CF/200 g of PVA binder/1 g of Degussa (Evonik) Tego® surfactant;
5. 300 g of PCM/679 g of solvent (water)/20 g of CF/1 g of CMC binder;
6. 300 g of PCM/694.59 g of solvent (water)/5 g of CMC binder/0.5 g of Degussa (Evonik) Tego® surfactant;
7. 300 g of PCM/699.5 g of solvent (water)/0.5 g of CMC binder;
8. 300 g of PCM/680 g of solvent (water)/20 g of PVA binder.

What is claimed is:

1. A process for manufacturing an agglomerate in the form of beads made up of microcapsules of a phase change material (PCM), wherein the process comprises wet-granulation and fluidized-bed drying.

2. The process of claim 1, wherein the wet granulation comprises a step of spraying a suspension comprising at least one aqueous solution and PCM microcapsules into a reactor while a gas stream flows upward through the reactor.

3. The process of claim 2, wherein the spray pressure is between 1 and 10 bar abs, the pressure in the reactor is between 0.9 and 1.1 bar abs, and the temperature of the gas stream is between 40 and 200° C.

4. The process of claim 2, wherein the suspension comprises between 10 and 50% by weight of PCM microcapsules.

5. The process of claim 2, wherein the suspension comprises carbon fiber.

6. The process of claim 5, wherein the suspension has a carbon fiber/PCM ratio of between 1 and 40 wt %.

7. The process of claim 2, wherein 0.001 to 1% by weight of surfactant is added to the aqueous solution.

8. The process of claim 7, wherein the surfactant is a siloxane-based surfactant.

9. The process of claim 2, wherein the suspension comprises a binder representing less than 30% by weight of the aqueous suspension.

10. The process of claim 9, wherein the binder is polyvinyl alcohol or carboxymethylcellulose.

11. The process of claim 1, wherein the wet granulation comprises a step during which at least a fraction of at least one constituent of the granulate in solid form is introduced separately.

12. The process of claim 1, wherein the phase change material is chosen from paraffins, fatty acids, nitrogen-containing compounds, oxygen-containing compounds, phenyls and hydrated salts, or a mixture of these compounds.

13. The process of claim 1, wherein the fluidized-bed drying is carried out by a gas at a temperature of between 40 and 200° C.

14. The process of claim 1, wherein the process utilizes a means for extracting the agglomerates of a given size or mass.

15. The process of claim 2, wherein the spray pressure is less than 3 bar abs, the pressure in the reactor is between 0.98 and 1.03 bar abs, and the temperature of the gas stream is between 60 and 90° C.

16. The process of claim 15, wherein the suspension comprises between 20 to 30% by weight of PCM microcapsules.

17. The process of claim 3, wherein the suspension comprises between 10 and 50% by weight of PCM micromolecules.

18. The process of claim 17, wherein the suspension comprises carbon fiber.

19. The process of claim 18, wherein the suspension has a carbon fiber/PCM ratio of between 1 and 40 wt %.

20. The process of claim 19, wherein 0.001 to 1% by weight of surfactant is added to the aqueous solution.

21. The process of claim 20, wherein the surfactant is a siloxane-based surfactant.

22. The process of claim 21, wherein the suspension comprises a binder representing less then 10% by weight of the aqueous suspension.

23. The process of claim 22, wherein the binder is polyvinyl alcohol or carboxymethyl cellulose.

24. The process of claim 2, wherein the phase change material is chosen from paraffins, fatty acids, nitrogen-containing compounds, oxygen-containing compounds, phenyls and hydrated salts, or a mixture of these compounds.

25. The process of claim 2, wherein the fluidized-bed drying is carried out by a gas at a temperature of between 40 and 200° C.

26. The process of claim 3, wherein the fluidized bed drying is carried out by air at a temperature of between 60 and 90° C.

* * * * *